(12) United States Patent
Yang et al.

(10) Patent No.: US 8,437,765 B2
(45) Date of Patent: May 7, 2013

(54) IDENTIFYING LOCATIONS FOR SMALL CELLS

(75) Inventors: Jin Yang, Orinda, CA (US); Yee Sin Chan, San Jose, CA (US); Matthew W. Nelson, Pleasanton, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/207,909

(22) Filed: Aug. 11, 2011

(65) Prior Publication Data

US 2013/0040648 A1    Feb. 14, 2013

(51) Int. Cl.
*H04M 11/00* (2006.01)

(52) U.S. Cl.
USPC .......... 455/446; 455/447; 455/443; 455/444; 455/440; 455/422.1; 455/449; 455/450; 455/453; 455/448

(58) Field of Classification Search .................. 445/446, 445/447, 443, 444, 440, 448, 449, 450, 453, 445/422.1
See application file for complete search history.

(56) References Cited

U.S. PATENT DOCUMENTS

| | | | |
|---|---|---|---|
| 2003/0017829 A1* | 1/2003 | Ching-Hsiang et al. | 455/446 |
| 2004/0202135 A1* | 10/2004 | Han et al. | 370/332 |
| 2004/0259565 A1* | 12/2004 | Lucidarme | 455/453 |
| 2010/0008313 A1* | 1/2010 | McHenry et al. | 370/329 |
| 2011/0009105 A1* | 1/2011 | Lee et al. | 455/418 |
| 2012/0052793 A1* | 3/2012 | Brisebois et al. | 455/1 |

* cited by examiner

*Primary Examiner* — Kamran Afshar
*Assistant Examiner* — Khalid Shaheed

(57) ABSTRACT

A device identifies mobile devices within a geographical area associated with a carrier network. The device further divides the geographical area into cells. The device also collects network statistics associated with the mobile devices. The device assigns values to the cells based on the network statistics, and identifies locations in which to place the small cells within the geographical area based on the values.

15 Claims, 12 Drawing Sheets

| 2 | 2 | 4 | 1 | 2 | 2 | 4 | 2 | 2 |
|---|---|---|---|---|---|---|---|---|
| 3 | 5 | 3 | 1 | 4 | 2 | 4 | 5 | 4 |
| 4 | 2 | 4 | 4 | 2 | 4 | 5 | 5 | 4 |
| 4 | 4 | 2 | 2 | 2 | 2 | 4 | 2 | 6 |
| 2 | 4 | 2 | 2 | 2 | 2 | 3 | 5 | 3 |
| 4 | 2 | 4 | 2 | 2 | 2 | 2 | 2 | 4 |
| 4 | 2 | 2 | 2 | 2 | 2 | 4 | 4 | 4 |
| 3 | 5 | 3 | 4 | 5 | 4 | 5 | 5 | 5 |
| 4 | 2 | 4 | 2 | 2 | 4 | 4 | 4 | 4 |

FIG. 5B

IDENTIFYING LOCATIONS FOR SMALL CELLS

BACKGROUND

Cellular phone traffic is continuously increasing. A cellular phone carrier traditionally uses macro base stations to handle traffic and signaling between mobile devices and a core of a cellular phone network. To accommodate the growing traffic, cellular phone carriers are planning to use small cells (e.g., a micro cell), in addition to macro base stations, in order to increase capacities of cellular phone networks.

One approach for adding small cells is to place the small cells a particular distance apart from each other (e.g., small cells are placed so that each one of the small cells covers a 2 mile radius). However, this approach does not take into account the actual need for small cells in particular locations. As a result, areas, that have relatively low amounts of cellular traffic, may have too many small cells, while areas, with relatively high amounts of cellular traffic, may have too few small cells. To ensure quality cellular services, carriers can increase quantities of small cells in all areas. Consequently, the carriers would waste resources by adding small cells where the small cells are not needed.

BRIEF DESCRIPTION OF THE DRAWINGS

FIGS. 5A and 5B illustrate an example of creating a grid map;

DETAILED DESCRIPTION OF PREFERRED EMBODIMENTS

The following detailed description refers to the accompanying drawings. The same reference numbers in different drawings may identify the same or similar elements.

A carrier may refer to one or more of a mobile network operator (MNO), a mobile phone operator, a carrier service provider (CSP), a wireless service provider, a wireless carrier, a cellular company, and/or any other company that provides mobile phone service(s) to users (e.g., subscribers of the carrier) via a network. A carrier may also refer to a carrier network (e.g., a cellular network) provided and operated by the carrier.

An implementation, described herein, may allow a carrier to deploy small cells in a cellular network based on network statistics associated with area(s) covered by the cellular network. The carrier may use a management device to collect the network statistics. The management device may create, based on the network statistics, a grid map that represent usage of (e.g., traffic in an area associated with) the carrier network. The management device may use the grid map to identify locations for small cells in the cellular network, which is a heterogeneous network. The carrier may deploy the small cells in the identified locations of the area associated with the carrier network. As a result, the carrier may deploy small cells in locations where the small cells are actually needed instead of using a rigid scheme that does not take the actual need into account. Placing the small cells where the small cells are most needed optimizes network performance of the cellular network while minimizing deployment costs.

Figure 1:
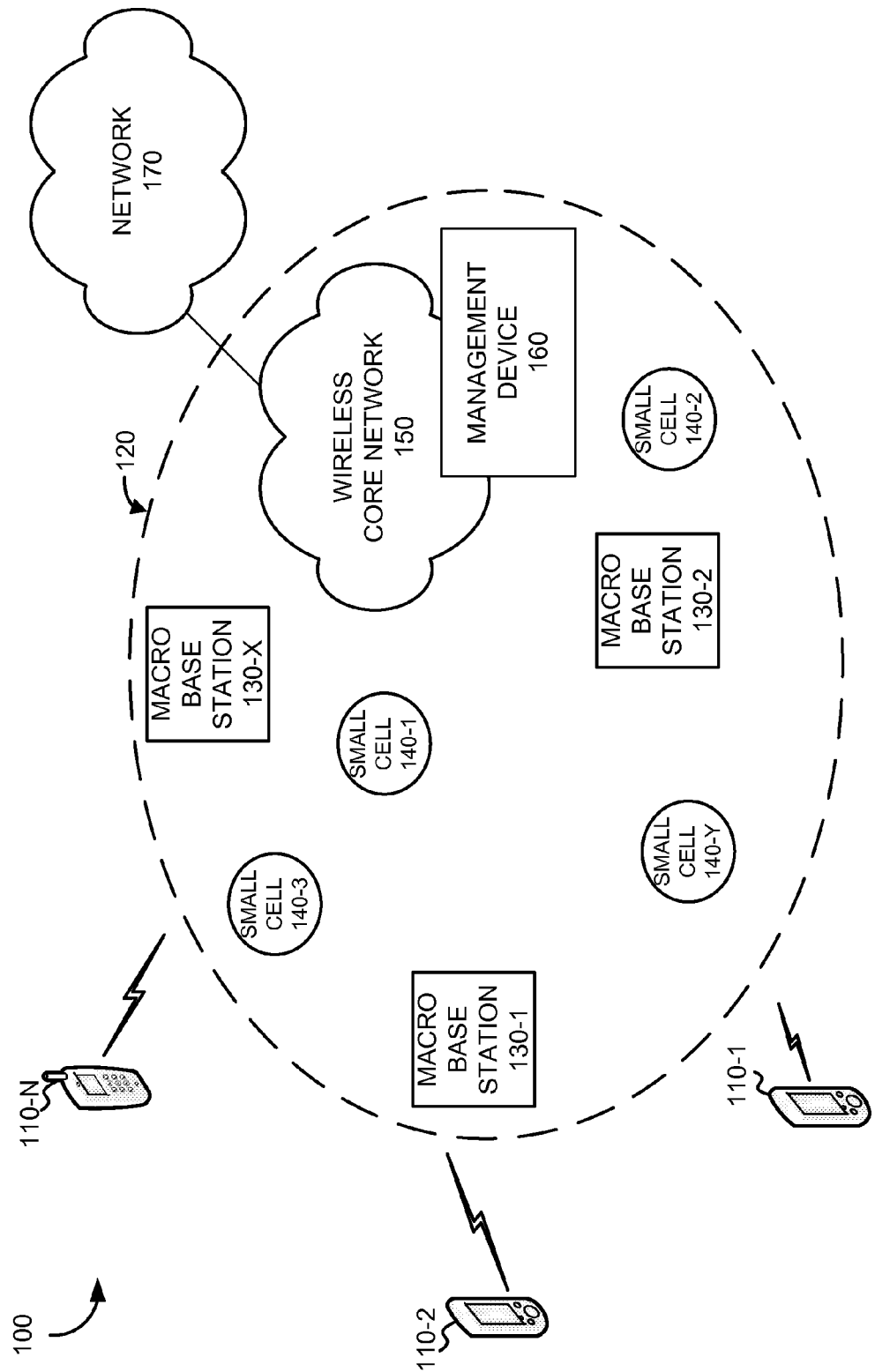
FIG. 1 is a diagram of an example environment in which systems and/or methods described herein may be implemented.

FIG. 1 is a diagram of an example environment 100 in which systems and/or methods described herein may be implemented. Environment 100 may include one or more of the following elements: multiple mobile devices 110-1, 110-2, . . . , 110-N (referred to collectively as "mobile devices 110" or generically as "mobile device 110"); a carrier network 120, including multiple macro base stations 130-1, 130-2, . . . , 130-X (referred to collectively as "macro base stations 130" or generically as "macro base station 130"), multiple small cells 140-1, 140-2, . . . , 140-X (referred to collectively as "small cells 140" or generically as "small cell 140"), a wireless core network 150, and a management device 160; and network 170. Components of environment 100 may interconnect via wired and/or wireless connections. Three mobile devices 110, one carrier network 120, three macro base stations 130, four small cells 140, one wireless core network 150, one management device 160, and one network 170 have been illustrated in FIG. 1 for simplicity. In practice, there may be additional mobile devices 110, carrier networks 120, macro base stations 130, small cells 140, wireless core networks 150, management devices 160, and/or networks 170.

Mobile device 110 may include any device capable of transmitting and receiving data (e.g., voice, text, images, and/or multimedia data) over carrier network 120. For example, mobile device 110 may be a self-contained data device, such as a mobile telephone, a smart phone, an electronic notepad, a personal digital assistant (PDA), etc. In another implementation, mobile device 110 may be connected to a computing device, such as a laptop or personal computer. Mobile devices 110 may use identical protocols to establish wireless communication sessions with macro base stations 130 and/or small cells 140. The wireless communication sessions may be used for voice (e.g., telephone calls) or data sessions.

Carrier network 120 may include any cellular network (e.g., a mobile phone network) that provides cellular phone service to users (e.g., subscribers) of a particular carrier. Carrier network 120 may provide the cellular phone service within a particular geographical area (e.g., the United States of America (USA)). Carrier network 120 may include a heterogeneous network that includes base stations of different types, including macro base stations 130 and different types of small cells 140, as described further below.

Macro base station 130 may represent a base station designed to provide a wireless communication service to a relatively large geographic area and simultaneously serve a relatively large number of mobile devices 110 (i.e., the relatively large geographic area and the relatively large number of mobile devices 110 are greater than a size of a geographic area and a number of mobile devices 110, respectively, served by small cell 140). Macro base station 130 may include one or more devices that receive, process, and/or transmit traffic, such as voice, video, text, and/or other data, destined for and/or received from mobile device 110.

Small cell 140 may refer to a micro cell, a pico cell, a femtocell, and/or one or more other devices that may act as a macro base station for a limited set of mobile devices 110 and/or for a limited geographic area (i.e., the limited set of mobile devices 110 and the limited geographic area are smaller than a set of mobile devices 110 and a size of a geographic area, respectively, served by macro base station 130). Small cell 140 may establish a wireless communication session with mobile device 110 by using the same protocols as those of macro base station 130. In one implementation, small cell 140 may include a nomadic device that may be relocated from one geographic location to another geographic location. In another implementation, one or more small cells 140 may be added to a geographic location of macro base station 130.

Mobile device 110 may connect to either macro base station 130 or small cell 140. In a typical implementation, mobile device 110 may connect to small cell 140 when mobile device 110 is within range of small cell 140. When mobile device 110 moves out of range of small cell 140, mobile device 110 may switch (e.g., handoff) the connection to base station 130. The switch may occur without interrupting the communication session of mobile device 110.

Wireless core network 150 may include components to implement a core network of the Evolution-Data Optimized (EVDO) standard. One implementation of such a core network includes the Evolved Packet Core (EPC) architecture. In other implementations, other network technologies, such as fourth-generation wireless telephone technology ("4G"), third-generation network technology ("3G"), or second-generation wireless telephone technology ("2G"), may be implemented instead of or in addition to EVDO. Components within wireless core network 150 may generally be connected via wired or wireless IP-based connections.

Management device 160 may include one or more server devices, or other types of computation or communication devices, of a network operations management system, that gather, process, search, and/or provide information in a manner described herein. In one implementation, management device 160 may collect network statistics from and/or about mobile devices 110, macro base stations 130, and/or small cells 140. The network statistics may include information about a geographical distribution and/or mobility of mobile devices 110 associated with carrier network 120, traffic statistics collected by macro base stations 130 and/or small cells 140, etc.

Management device 160 may analyze the network statistics to determine where traffic is concentrated and, therefore, where additional small cells 140 could be placed to facilitate network communications. To analyze the network statistics, management device 160 may create grid map(s) based on the network statistics. In one implementation, management device 160 may divide a coverage area associated with cellular network 120 into multiple geographical areas before collecting the network statistics. Each one of the grid maps may represent one of the geographical areas. A size of an area represented by an individual grid map may depend on the size of the coverage area and/or an amount of traffic associated with carrier network 120. For example, the size represented by the individual grid map may decrease as the amount of traffic decreases. Management device 160 may use the grid map(s) to identify geographic locations to place additional small cells 140.

Network 170 may include one or more wired and/or wireless networks. For example, network 170 may include another cellular network, a public land mobile network (PLMN), a second generation (2G) network, a third generation (3G) network, a fourth generation (4G) network, a fifth generation (5G) network, and/or one or more other networks. Additionally, or alternatively, network 170 may include a wide area network (WAN), a metropolitan area network (MAN), a telephone network (e.g., the Public Switched Telephone Network (PSTN)), an ad hoc network, an intranet, the Internet, a fiber optic-based network (e.g., a FiOS network), and/or a combination of these or other types of networks. In one implementation, network 170 may include carrier network 120 and/or wireless core network 150.

Figure 2:
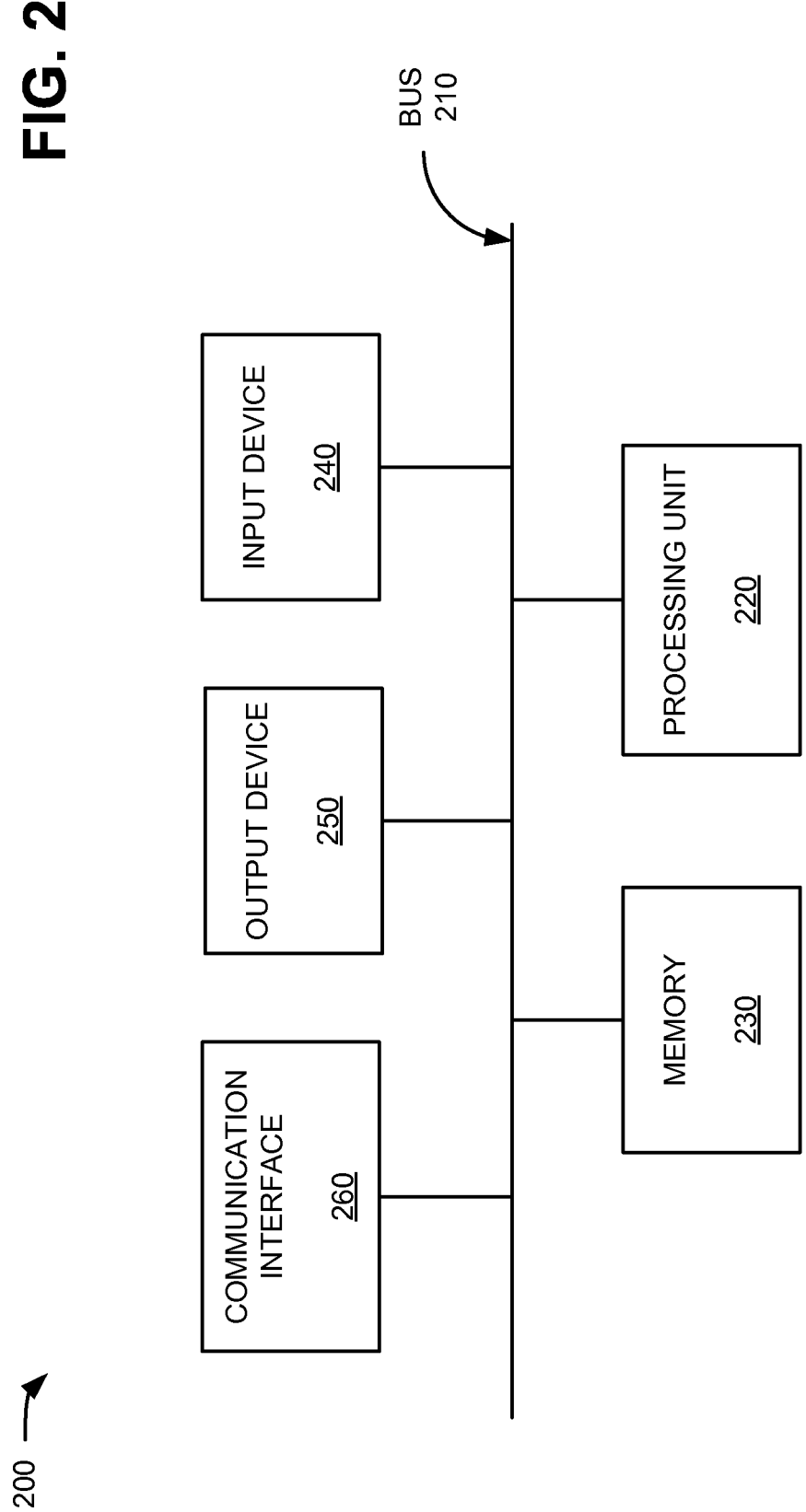
FIG. 2 is a diagram of example components of one or more devices of FIG. 1.

FIG. 2 is a diagram of example components of a device 200 that may correspond to one or more of macro base station 130, small cell 140, or management device 160. Each of macro base station 130, small cell 140, or management device 160 may include one or more devices 200. As shown, device 200 may include a bus 210, a processing unit 220, a memory 230, an input device 240, an output device 250, and a communication interface 260.

Bus 210 may include one or more connections that permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, a button, one or more biometric mechanisms, or the like. Output device 250 may include a device that outputs information to the operator, such as a display, a speaker, a light emitting diode, etc.

Communication interface 260 may include any transceiver-like mechanism that enables device 200 to communicate with other devices and/or systems. For example, communication interface 260 may include wired and/or wireless components for communicating with other devices, such as other devices of environment 100.

As described below, device 200 may perform certain operations. Device 200 may perform these operations in response to processing unit 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of device 200, in other implementations, device 200 may include fewer components, different components, differently arranged components, or additional components than depicted in FIG. 2. Alternatively, or additionally, one or more components of device 200 may perform one or more other tasks described as being performed by one or more other components of device 200.

Figure 3:
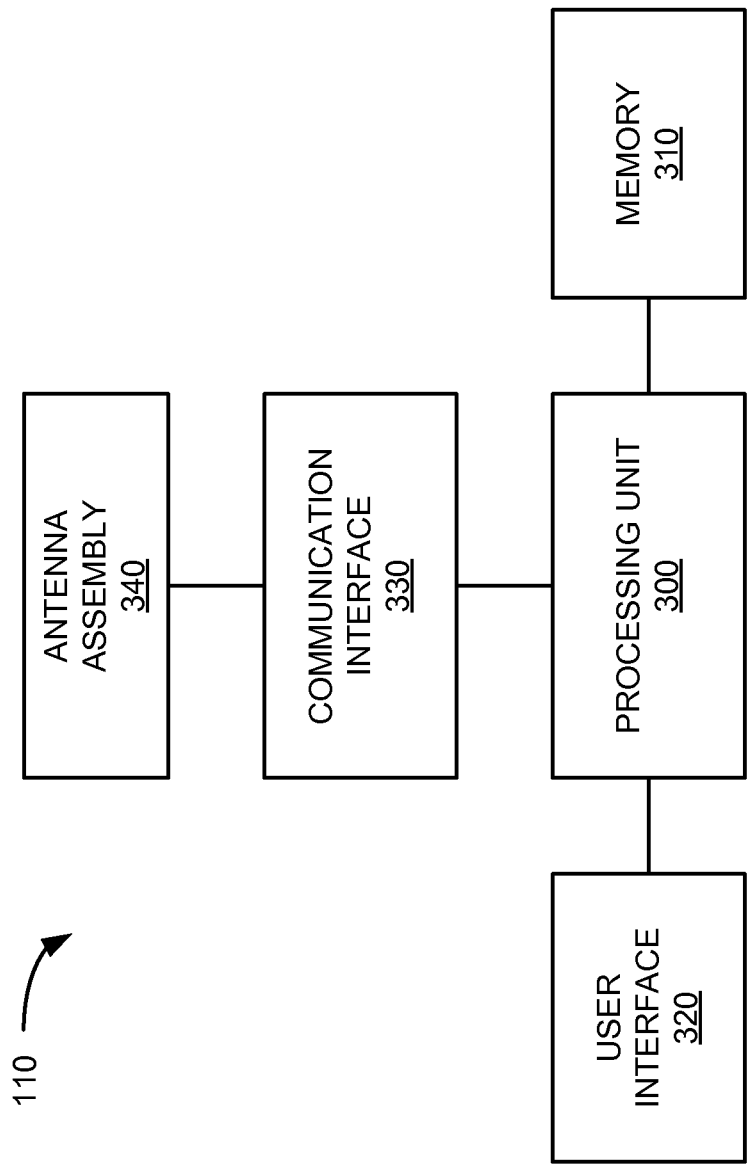
FIG. 3 is a diagram of example components of a mobile device of FIG. 1.

FIG. 3 is a diagram of example components of mobile device 110. As shown, mobile device 110 may include a processing unit 300, a memory 310, a user interface 320, a communication interface 330, and/or an antenna assembly 340.

Processing unit 300 may include one or more processors, microprocessors, ASICs, FPGAs, or the like. Processing unit 300 may control operation of mobile device 110 and its components. In one implementation, processing unit 300 may control operation of components of mobile device 110 in a manner described herein.

Memory 310 may include a RAM, a ROM, and/or another type of memory to store data and/or instructions that may be used by processing unit 300.

User interface 320 may include mechanisms for inputting information to mobile device 110 and/or for outputting information from mobile device 110. Examples of input and output mechanisms might include buttons (e.g., control buttons, keys of a keypad, etc.) or a touch screen interface to permit data and control commands to be input into mobile device 110; a speaker to receive electrical signals and output audio signals; a microphone to receive audio signals and output electrical signals; and/or a display to output visual information.

Communication interface 330 may include, for example, a transmitter that may convert baseband signals from processing unit 300 to radio frequency (RF) signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive RF signals over the air. Antenna assembly 340 may, for example, receive RF signals from communication interface 330 and transmit RF signals over the air, and receive RF signals over the air and provide RF signals to communication interface 330. In one implementation, for example, communication interface 330 may communicate, via antenna assembly 340, with a network and/or devices connected to a network (e.g., network 120).

As described below, mobile device 110 may perform certain operations. Mobile device 110 may perform these operations in response to processing unit 300 executing software instructions of an application contained in a computer-readable medium, such as memory 310. The software instructions may be read into memory 310 from another computer-readable medium or from another device via communication interface 330. The software instructions contained in memory 310 may cause processing unit 300 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows example components of mobile device 110, in other implementations, mobile device 110 may contain fewer components, different components, differently arranged components, or additional components than depicted in FIG. 3. In still other implementations, one or more components of mobile device 110 may perform one or more other tasks described as being performed by one or more other components of mobile device 110.

Figure 4:
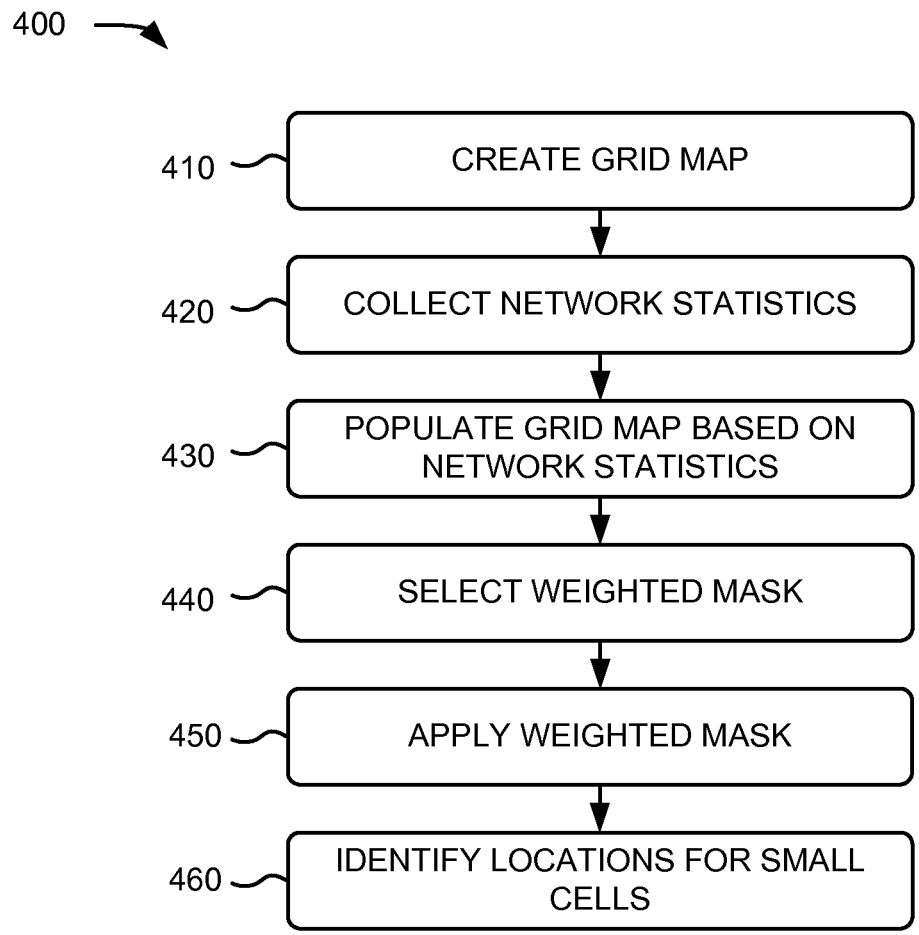
FIG. 4 is a flowchart of an example process for identifying locations at which to place small cells.

FIG. 4 is a flowchart of an example process 400 for identifying geographic locations at which to place small cells 140. In one implementation, management device 160 may perform process 400. Alternatively, process 400 may be performed by one or more other devices, alone or in combination with management device 160. A portion of process 400 is described below in reference to FIGS. 5A, 5B, 6, and 7A-7D.

As shown in FIG. 4, process 400 may include creating a grid map (block 410). For example, management device 160 may determine a geographical area associated with carrier network 120. The geographical area may include a portion, or all, of the area covered by carrier network 120. Management device 160 may further determine a coverage area of small cells 140 that may be placed within the geographical area. Management device 160 may divide the geographical area into cells, based on the coverage area of small cell 140, to create the grid map.

For example, if the coverage area of small cells 140 is approximately a first particular size (e.g., 700 meters), each cell of the grid map may represent a first amount of area (e.g., 100 square meters) of the geographical area. If the coverage area of small cells 140 is approximately a second particular size (e.g., 500 meters), each cell of the grid map may represent a second amount of area (e.g., 200 square meters) of the geographical area. In one implementation, an operator of carrier network 120 may determine what amount of area each cell represents based on the coverage area of small cells 140. In another implementation, the operator of carrier network 120 may provide a formula to calculate the amount of area each cell represents based on the coverage area of small cells 140. Management device 160 may use the formula to calculate the amount of area of each cell of the grid map.

Figure 5A:
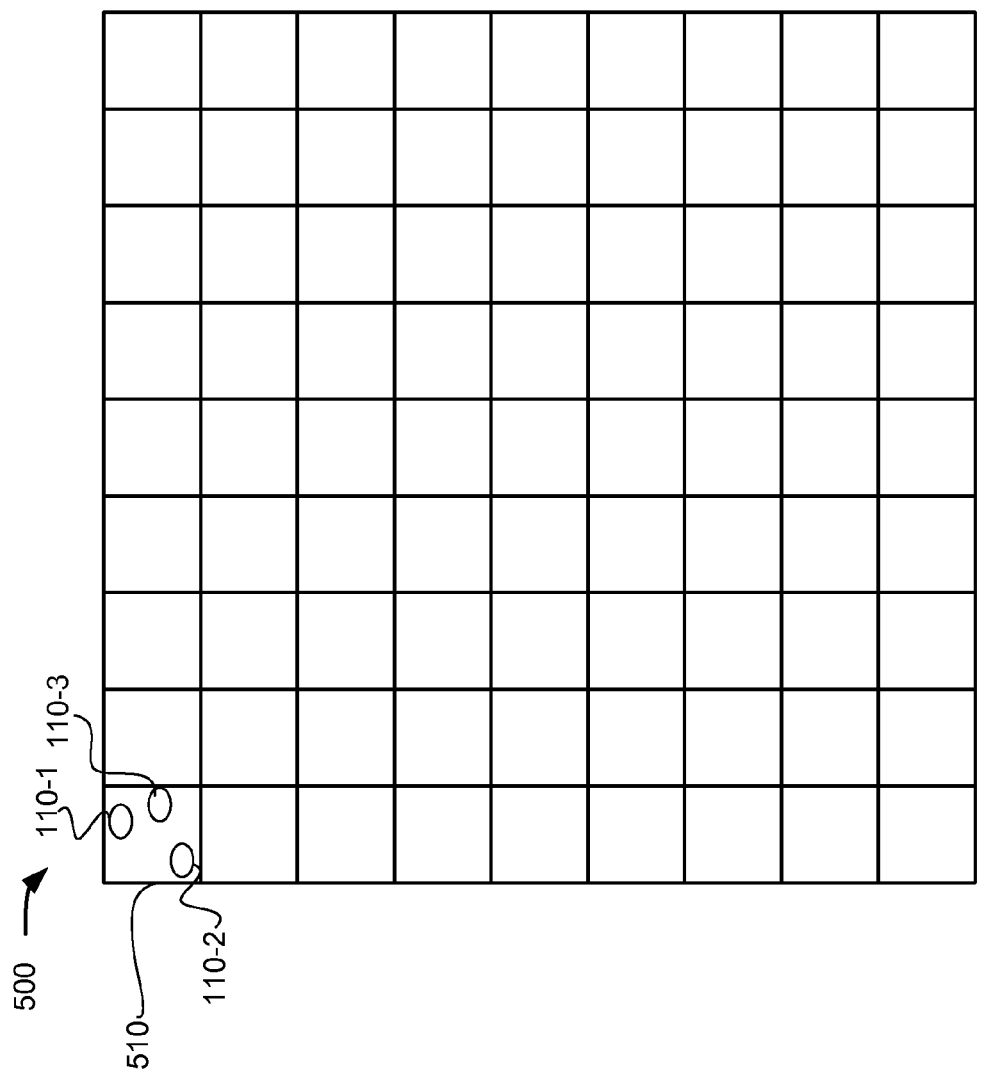

FIG. 5A illustrates an example grid map 500 created by management device 160. Grid map 500 may represent the geographical area associated with carrier network 120. Assume that the geographical area includes 810,000 square meters. In this case, grid map 500 may include 81 cells. Each one of the cells may represent, for example, 10,000 square meters.

Returning to FIG. 4, process 400 may further include collecting network statistics (block 420). For example, management device 160 may collect network statistics associated with the geographical area associated with carrier network 120. In one implementation, management device 160 may receive global positioning system (GPS) coordinates of mobile devices 110 within the geographical area. Management device 160 may further determine information associated with usage of carrier network 120 by each one of mobile devices 110 within each cell of grid map 500.

For example, for a cell 510 of grid map 500 (FIG. 5A), management device 160 may determine that mobile devices 110-1, 110-2, and 110-3 use carrier network 120 within cell 510. Management device 160 may further determine that, within cell 510, mobile device 110-1 has an average usage of 4 MB/hr, mobile device 110-2 has an average usage of 3 MB/hr; and mobile device 110-3 has an average usage of 1 MB/hr.

Figure 8:
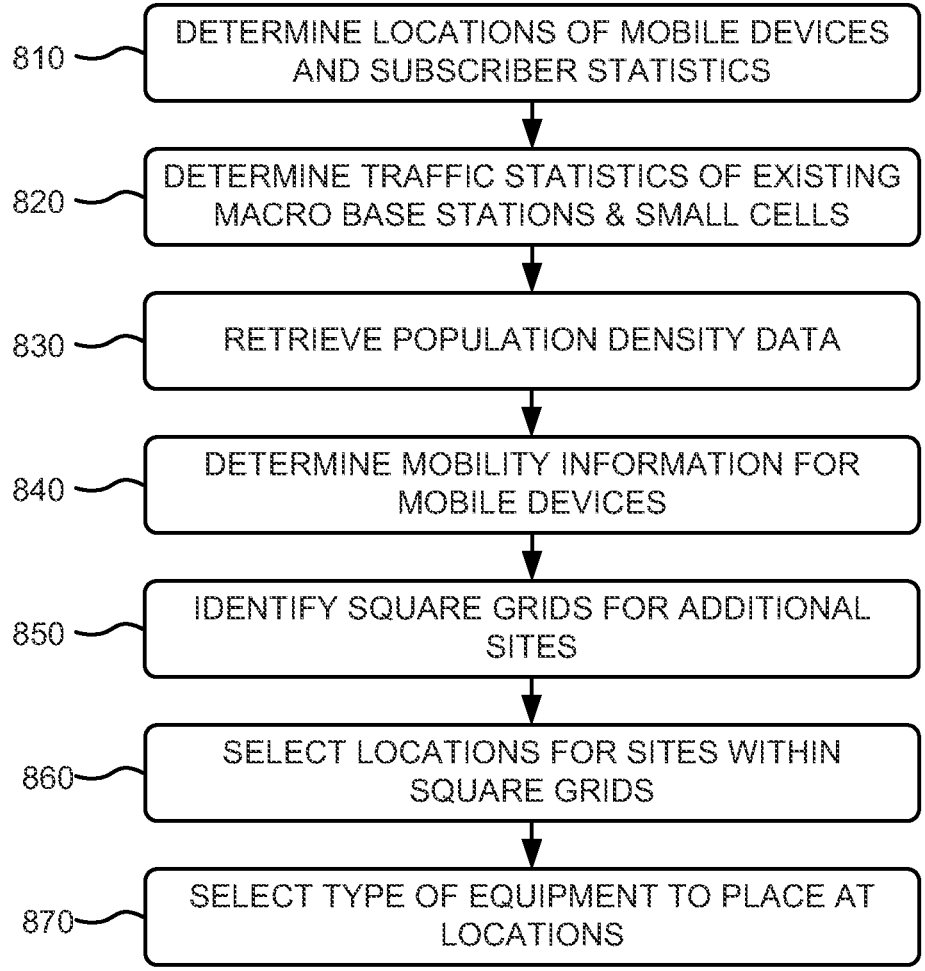
FIG. 8 is a flowchart of an example process for collecting and using network statistics to place small cells.

In another implementation, management device 160 may collect one or more other network statistics, including, for example, traffic statistics associated with and/or collected by macro base stations 130 and/or small cells 140; population information in areas associated with the cells of grid map 500; and/or mobility (e.g., rate of movement 30 miles/hour)) of mobile devices 110; and/or any other information used to identify possible geographic locations at which to place small cells 140, as described further below in reference to FIG. 8.

Process 400 may also include populating grid map 500 based on the network statistics (block 430). For example, management device 160 may determine a respective value to assign to each cell of grid map 500 based on the network statistics. In one implementation, the operator of carrier network 120 may create a scale (e.g., 1-10) that management device 160 may use to select a value for each cell. Management device 160 may calculate a total average usage (or another value that represent the usage of carrier network 120) for each cell of grid map 500 based on the network statistics. The scale may provide information about ranges (e.g., one of which includes the total value average usage or the other value) that corresponds to each value on the scale. Management device 160 may select a value from the scale for each cell based on which corresponding range the calculated total value average usage or other value falls within.

For example, management device 160 may calculate a total average usage (e.g., per hour) for cell 510 of grid map 500 by adding the average usages of all bile devices 110 within cell 510 (e.g., 4 MB+3 MB+1 MB=8 MB). The scale may indicate, for example, that if the total average usage of a cell is between a range of 7 MB and 12 MB, the cell should be assigned a value of 4 on the scale. Accordingly, as illustrated in FIG. 5B, management device 160 may assign the value of 4 to cell 510. Assume that management device 160 calculates that a total average usage of cell 520 is equal to 6 MB. The scale may further indicate that if the total average usage of a cell is between a range of 5 MB and 7 MB, the cell should be assigned a value of 3 on the scale. Accordingly, as illustrated in FIG. 5B, management device 160 may assign the value of 3 to cell 520. The scale may further indicate how to modify the values based on the other network statistics. For example, the scale my indicate that a value of a cell should be increased by 1 if a daytime population, within the area corresponding to the cell, is greater than 100 people.

In another implementation, the operator of carrier network 120 may provide a formula that management device 160 may use to determine a value for each cell. For example, the formula may indicate that a value of a cell is equal to a product of a total average usage of the cell and a weight that is based on one or more other factors (value=total average usage× weight). For example, the weight may equal a particular value (e.g., 0.5) when a total amount of data being transmitted/per hour via macro base station 130, that is associated with a particular cell, is greater than a particular threshold (e.g., 100 MB/hour). For cell 510, for example, of grid map 500, management device 160 may use the formula to calculate the value of 4 (e.g., value=8×0.05) for cell 510 and a value of 3 for cell 520 of grid map 500. As further shown in FIG. 5B, management device 160 may select/calculate a respective value for each cell of grid map 500.

Figure 6:
FIG. 6 illustrates example weighted masks.

Process 400 may also include selecting a weighted mask (block 440). For example, management device 160 may determine a coverage of small cell 140 based on an output power (e.g., RF power (e.g., 100 mW)) of small cell 140. For example, management device 160 may determine that the coverage is equal to an area of a 3×3 square grid of grid map 500 when the output power is 100 mW; management device 160 may determine that the coverage is equal to an area of a 5×5 square grid of grid map 500 when the output power is 200 mW; etc. Thereafter, management device 160 may select a weighted mask that corresponds to the coverage. FIG. 6 illustrates examples of weighted masks. Management device 160 may select a weighted mask 610 when the coverage is equal to the area of the 3×3 square grid. Management device 160 may select a weighted mask 620 when the coverage is equal to the area of the 5×5 square grid.

Process 400 may also include applying the weighted mask (block 450). For example, assume that management device 160 determines that the coverage is equal to the area of the 3×3 square grid and selects weighted mask 610. Management device 160 may slide the weighted mask 610 over grid map 500. In some implementations, management device 160 may apply the weighted mask to each group of nine adjacent cells of grid map 500 that make up a different 3×3 square grid. Management device 160 may include each cell in multiple square grids.

Figure 7A:
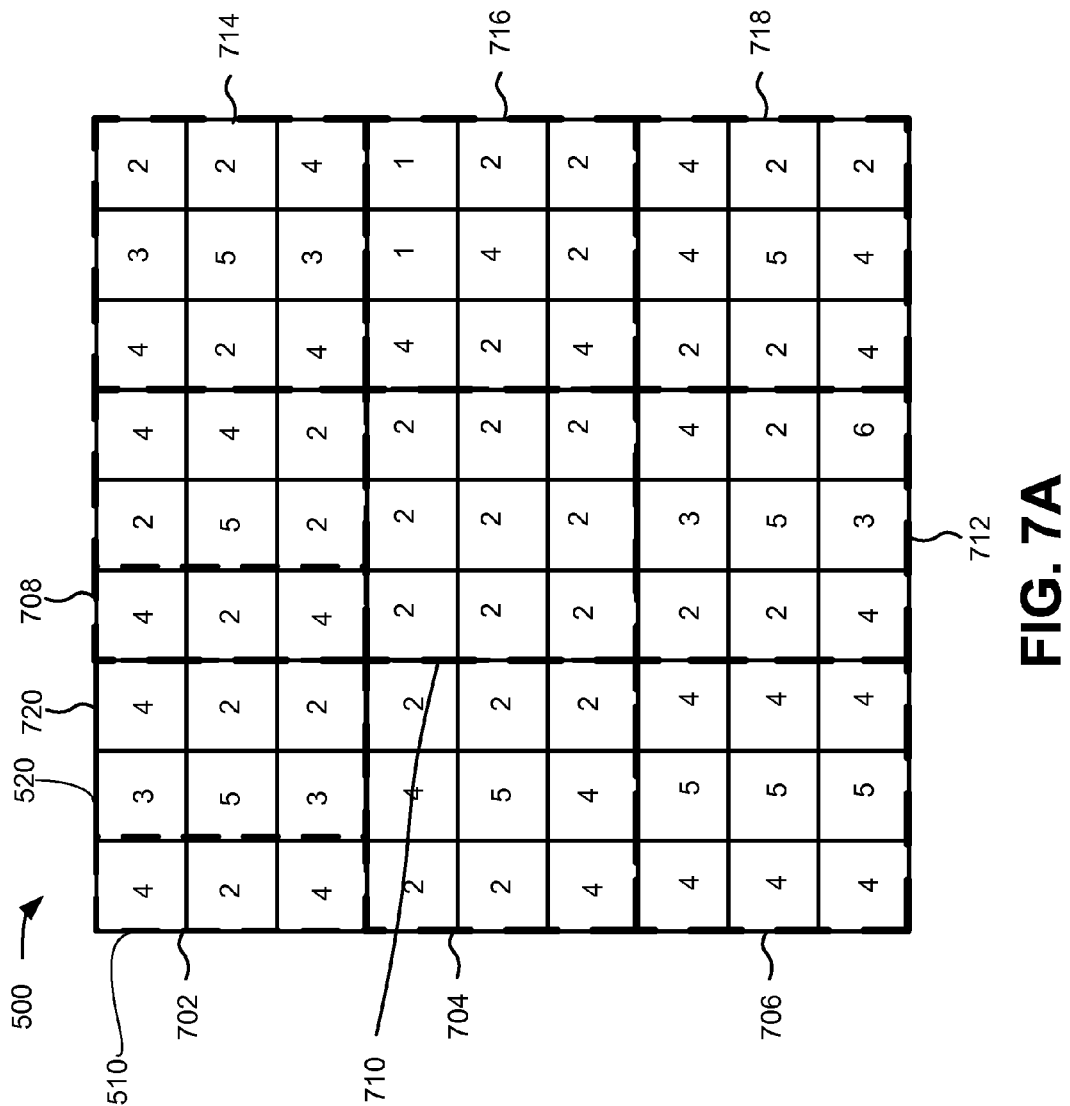
FIGS. 7A-7D illustrate an example of applying a weighted mask and identifying locations for small cells.

FIG. 7A illustrates an example of grid map 500 that includes square grids 702, 704, 706, 708, 710, 712, 714, 716, and 718. Each one of square grids 702-718 may include nine cells of grid map 500. Only nine square grids 702, 704, 706, 708, 710, 712, 714, 716, and 718 have been illustrated in FIGS. 7A-7D and are discussed below for simplicity. In practice, grid map 500 may include additional square grids that overlap with square grids 702, 704, 706, 708, 710, 712, 714, 716, and 718. For example, grid map 500 may also include a square grid 720 that also includes cell 520 and eight other cells that are also included in square grids 702 and 708.

Figure 7B:
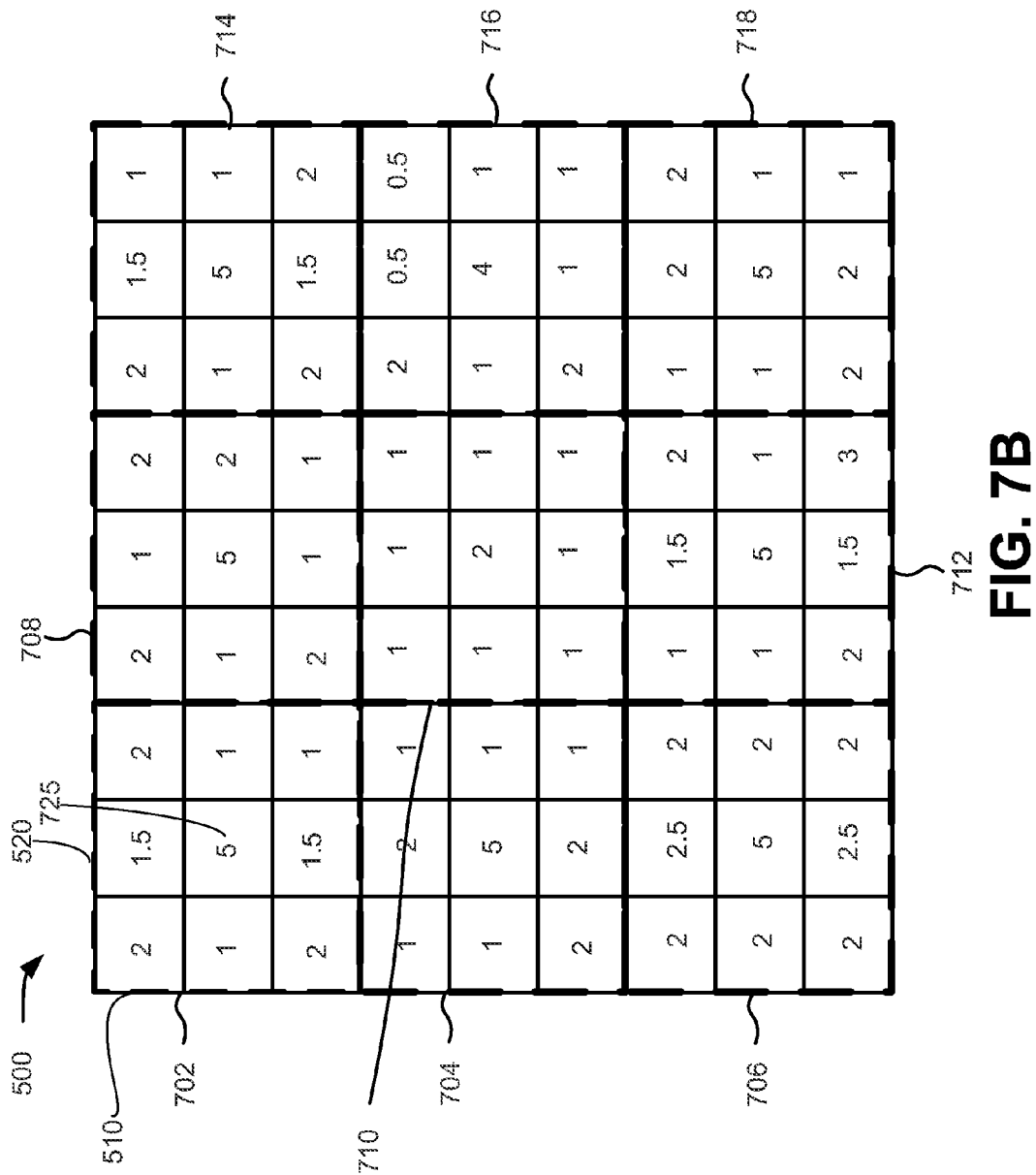

FIG. 7B illustrates an example of applying weighted mask 610 to each one of square grids 702-718 of grid map 500. For example, management device 160 may multiply a value (e.g., 4) of cell 510 in square grid 702 by a weight (e.g., ½) in a corresponding position (top-left corner) of weighted mask 610 in order to calculate a weighted value (e.g., 2) in cell 510, as shown in FIG. 7B. Similarly, management device 160 may multiply a value (e.g., 3) of cell 520 in square grid 702 by a weight (e.g., ½) in a corresponding position (top-middle) of weighted mask 610 in order to calculate a weighted value (e.g., 1.5) in cell 520, as shown in FIG. 7B. Management device 160 may calculate the weighted values of 2, 1, 5, 1, 2, 1.5, and 1 for the other cells of square grid 702, as shown in FIG. 7B. Management device 160 may use weighted mask 610 to similarly calculate weighted values of all other cells of square grids 704, 706, 708, 710, 712, 714, 716, and 718, as shown in FIG. 7B. As discussed above, management device 160 may use weighted mask 610 to calculate weighted values for other square grids that are not illustrated in FIG. 7B. Therefore, management device 160 may calculate multiple weighted values for each cell. A quantity of weighted values calculated for a particular cell may equal a quantity of square grids that include the particular cell. For example, management device 160 may calculate weighted values of 1.5, 2, 2, 2.5, 2, 1, 1.5, 1, and 2 for the cells that are included in square grid 720 (shown in FIG. 7A). A center cell 725 (FIG. 7B) of square grid 702 may have a weighted value of 5 when the cell is weighted for square grid 702 and a value of 2.5 when the cell is weighted for square grid 720.

Figure 7C:
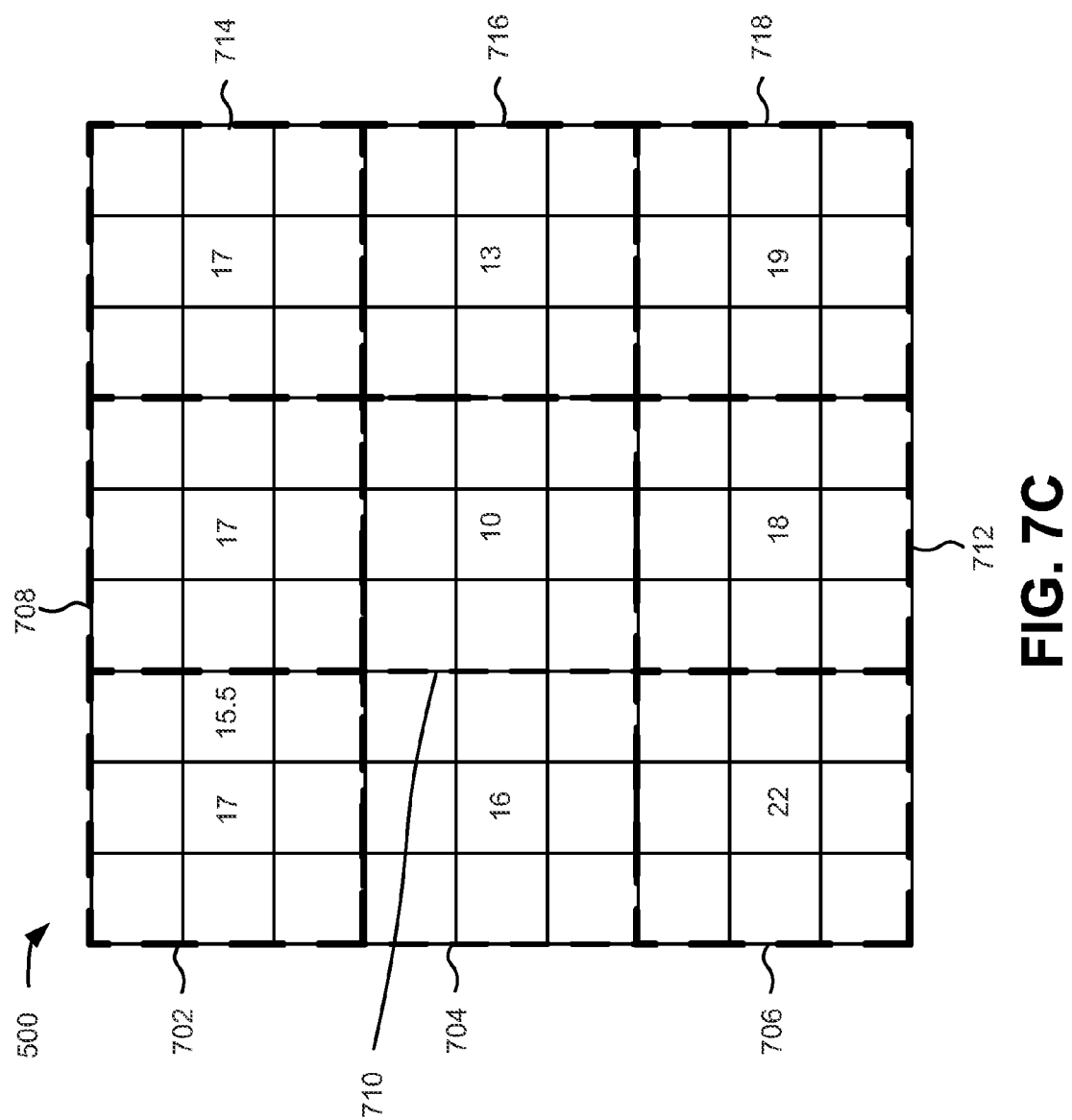

Process 400 may also include identifying possible geographic locations in which to place small cells 140 (block 460). For example, after applying weighted mask 610, management device 160 may calculate a total value for each one of square grids 702, 704, 706, 708, 710, 712, 714, 716, and 718. Management device 160 may calculate a total value for square grid 702 by adding all the weighted values assigned to cells of square grid 702 (e.g., 2+1.5+2+1+5+1+2+1.5+1=17). Management device 160 may similarly calculate total values for square grids 704, 706, 708, 710, 712, 714, 716, and 718 based on the weighted values (shown in FIG. 7B) assigned to the cells of grid map 500. FIG. 7C illustrates total values that are calculated for each one of square grids 702, 704, 706, 708, 710, 712, 714, 716, and 718, including 17, 16, 22, 17, 10, 18, 17, 13, and 19, respectively. Management device 160 may use the total values (shown in FIG. 7C) to identify possible geographic locations in which to place small cells 140. As discussed above, management device 160 may also calculate total values for square grids that are not shown in FIG. 7C and overlap with square grids 702, 704, 706, 708, 710, 712, 714, 716, and 718. For example, management device 160 may calculate a total value for square grid 720 (FIG. 7A) by adding all the weighted values assigned to cells of square grid 720 (e.g., 1.5+2+2+2.5+2+1+1.5+1+2=15.5 (as shown in FIG. 7C)).

Figure 7D:
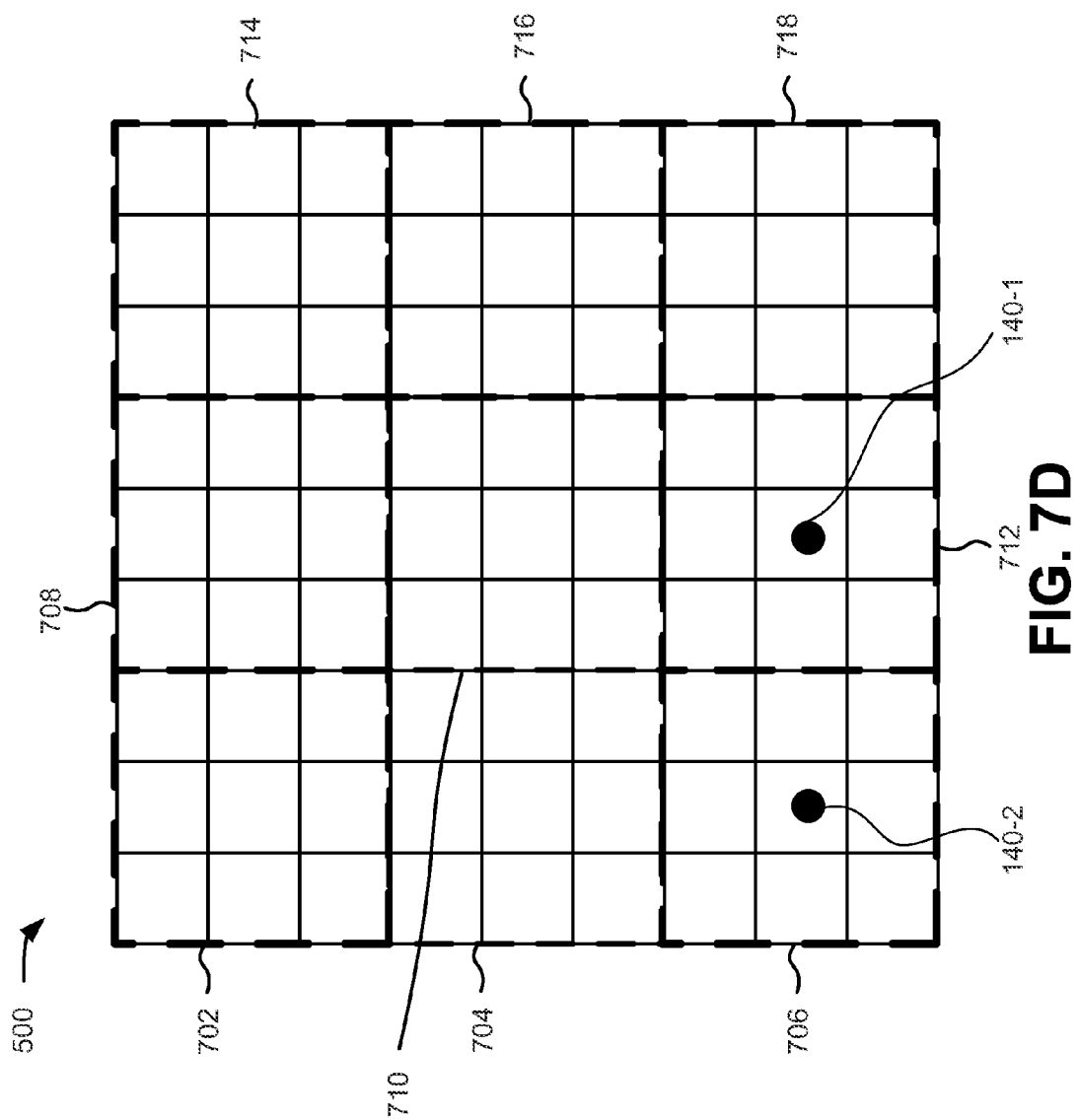

In one implementation, the operator of carrier network 120 may set a particular threshold for selecting the geographic locations in which to place small cells. Assume that the operator selects the particular threshold of 17. Management device 160 may compare each one of the total values to the particular threshold to determine which ones of the total values are greater than the particular threshold. Management device 160 may select to place small cells 140 in center cells of square grids that correspond to the total values that are greater than the particular threshold. As shown in FIG. 7D, management device 160 may select to place small cell 140-1 in square grid 712 because the total value 18 of square grid 712 (as shown in FIG. 7C) is greater than the particular threshold of 17. Management device 160 may further select to place small cell 140-2 in square grid 706 because the total value 18 of square grid 706 (as shown in FIG. 1C) is greater than the particular threshold of 17.

In another implementation, the operator of carrier network 120 may select a particular quantity of small cells that are to be deployed into the geographical area associated with grid map 500. Assume that the operator selects the particular quantity of 2. Management device 160 may determine which 2 of the total values, associated with grid map 500, are the highest (e.g., 22, 18). Management device 160 may select to place small cells 140 in square grids corresponding to the highest total values, which are square grids 706 and 712 (as shown in FIG. 7D). In other implementations, the operator of carrier network 120 and/or management device 160 may select locations for small cells 140 by using one or more other numerical methods (e.g., gradient descent).

FIG. 8 is a flowchart of an example process 800 for collecting and using network statistics. In one implementation, management device 160 may perform process 800. Alternatively, process 800 may be performed by one or more other devices, alone or in combination with management device 160.

As shown in FIG. 8, process 800 may include determining locations of mobile devices 110 and subscriber statistics (block 810). For example, management device 160 may receive GPS information from mobile devices 110 that are located within a geographical area associated with grid map 500. Management device 160 may determine latitude and longitude information of individual mobile devices 110 based on the GPS information. Management device 160 may further determine, based on the latitude and longitude information, in which cells (e.g., cell 510) of grid map 500 those mobile devices 110 are located. Thereafter, management device 160 may determine subscriber statistics associated with those mobile devices 110. The subscriber statistics may include, for example, for how long (e.g., 2 hrs) and/or at what times (e.g., between 10:00 AM-12:00 PM) mobile devices 110 remain in those cells, average usage (e.g., 2 MB) of carrier network 120 by mobile devices 110 while in those cells, etc.

Process 800 may further include determining traffic statistics of existing macro base stations 130 and small cells 140 (block 820). For example, management device 160 may receive traffic statistics from macro base stations 130 and small cells 140 and/or calculate other traffic statistics based on the received traffic statistics. In one implementation, the traffic statistics may include total amounts of data (e.g., 100 MB) that pass through macro base station 130 or small cell 140. Alternatively, or additionally, the traffic statistics may include total data rates of macro base stations 130 and/or small cells 140. Management device 160 may receive information about the total data rates and/or calculate the total data rates based on the total amounts of data. A total data rate may include an amount of traffic that passes through macro base station 130 or small cell 140 within a particular period of time (e.g., 100 MB/hour). Alternatively, or additionally, the traffic statistics may include types of traffic (e.g., voice data, video data, etc.) that pass through macro base stations 130 and/or small cells 140. The traffic statistics may also include classes of traffic (e.g., best effort or guaranteed bit rate) that pass through macro base stations 130 and/or small cells 140.

Process 800 may also include retrieving population density data (block 830). In one implementation, management device 160 may retrieve population density data for the geographical area associated with carrier network 120 from a service that collects, stores, and/or provides population density data. The population density data may include information about an overall population density, a nighttime population density, and/or a daytime population density for each cell of grid map 500 (FIG. 5) that represents the geographical area.

Process 800 may also include determining mobility information for mobile devices (block 840). For example, based on information collected about geographical locations of mobile devices 110, management device 160 may determine mobility information for mobile devices 110 within the geographical area associated with carrier network 120. The mobility information may include, for example, an average rate (e.g., 30 miles per hour (mph)) at which each mobile device 110 moves between the cells of grid map 500 and/or through which ones of the cells each mobile device 110 moves through.

Process 800 may also include identifying square grids for additional sites (block 850). For example, the operator of carrier network 120 may place equipment at one or more additional sites to handle increased amounts of traffic. A site may refer to a new possible geographic location in which to place the additional equipment. The equipment may include a macro base station 130 and/or one or more different types of small cells 140. To identify square grids for the additional sites, management device 160 may populate grid map 500 (as shown in FIG. 5B) based on the subscriber statistics associated with mobile devices 110 and/or the traffic statistics of existing macro base stations 130 and small cells 140. In another implementation, management device 160 may populate different grid maps based on different sets of statistics (e.g., the subscriber statistics, the traffic statistics of macro base stations 130, etc.). Management device 160 may create grid map 500 by combining (e.g., averaging) the different grid maps into grid map 500. Management device 160 may identify square grids for additional sites, as described above in reference to FIGS. 7A-7C. For example, management device 160 may determine that square grid 702 of grid map 500 requires an additional site because square grid 702 has more traffic than any other square grid of grid map 500.

Process 800 may also include selecting locations for the sites within the square grids (block 860). For example, management device 160 may use the population density data to select a cell within square grid 702 as a location for the site. The location may refer to a particular geographical area within square grid 702. Management device 160 may, for example, select cell 510 of square grid 702 because cell 510 has a daytime population density that is greater than the daytime population densities of all other cells of square grid map 502. In other implementations, the operator of carrier network 120 and/or management device 160 may select one or more locations within a particular square grid (e.g., square grid 702) as sites for additional small cells 140 and/or macro base stations 130. The operator of carrier network 120 and/or management device 160 may select the locations based on other considerations, including, for example optimal power levels, antenna placement, and/or orientation.

Process 800 may also include selecting a type of equipment to place at the locations (block 870). For example, management device 160 may select a type of equipment to place in cell 510 based on the mobility information. Management device 160 may, for example, select to use a first type of small cell 140 (e.g., a micro cell) as the equipment when the average mobility is less than a first threshold (e.g., 30 mph). Management device 160 may select to use a second type of small cell 140 or a macro base station 130 as the equipment when the average mobility is greater than or equal to a second threshold (e.g., 30 mph). Assume that management device 160 determines that the average mobility of a mobile device within cell 510 is 25 mph. Accordingly, management device may select to place the first type of small cell 140, as the additional equipment, in cell 510 of square grid 702.

In implementations described above, management device 160 may collect network statistics associated with mobile device 110 within a geographical area associated with a carrier network. Management device 160 may identify geographic location in which to place additional small cells within the geographical area based on the network statistics.

The foregoing description of implementations provides illustration and description, but is not intended to be exhaustive or to limit the possible implementations to the precise form disclosed. Modifications and variations are possible in light of the above teachings or may be acquired from practice.

For example, while series of blocks have been described with regard to FIGS. 4 and 8, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the system implementations may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the disclosure of the implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   identifying, by a computing device, mobile devices within a geographical area associated with a carrier network;
   dividing, by the computing device, the geographical area into cells;
   collecting, by the computing device, network statistics associated with the mobile devices;
   assigning, by the computing device, values to the cells based on the network statistics; and
   identifying, by the computing device, locations in which to place small cells within the geographical area,
   wherein dividing the geographical area into the cells comprises:
      creating a grid map for the geographical area, and
      dividing the grid map into grids based on a coverage area associated with one of the small cells, wherein one of the grids comprises a plurality of the cells, and
   wherein identifying the locations in which to place the small cells comprises:
      calculating total values for the grids based on the assigned values, including:
         selecting a weighted mask based on a size of the grids,
         generating weighted values for the cells, by applying the weighted mask to the grids, based on the values assigned to the cells, and
         adding the weighted values of one of the grids to calculate the total value corresponding to the one of the grids, and
      selecting, based on the total values, one or more of the grids as the locations in which to place the small cells.

2. The method of claim 1, where the small cells comprise one or more of:
   a micro cell,
   a pico cell, or
   a femtocell.

3. The method of claim 1, where the network statistics comprise one or more of:
   information identifying geographic locations of the mobile devices,
   information identifying an average use of the carrier network by one of the mobile devices,
   information identifying traffic statistics associated with a macro base station, of the carrier network, that is located within the geographical area, or
   information about population within the geographical area.

4. The method of claim 3, where the traffic statistics comprise one or more of:
   information identifying a total amount of data that passes through the macro base station within a particular period of time,
   information identifying one or more types of the data, where the one or more types comprise at least one of voice data or video data, or
   information identifying one or more classes of traffic associated with the data.

5. The method of claim 1, wherein each one of the total values, corresponding to the selected one or more of the grids, is greater than a particular threshold.

6. The method of claim 1, where assigning the values to the cells comprises:
   selecting one of the values assigned to one of the cells based on the network statistics associated with the one of the cells, or
   calculating the one of the values assigned to the one of the cells using the network statistics associated with the one of the cells.

7. A device comprising:
a memory to store instructions; and
a processor to execute one or more of the instructions to:
  receive first traffic statistics from macro base stations within a geographical area associated with a carrier network,
  calculate second traffic statistics, based on the first traffic statistics, to determine network statistics, wherein the first traffic statistics and the second traffic statistics comprise one or more of:
    a total amount of traffic that passes through one of the macro base stations, or
    a rate that represents the total amount of traffic that passed through the one of the macro base stations within a particular period of time,
  create a grid map, for the geographical area, by dividing the geographical area into cells,
  assign values to cells of the grid map based on the network statistics,
  divide the grid map into grids, wherein each one of the grids comprises a plurality of the cells,
  calculate total values for the grids based on the values assigned to the cells, including:
    select a weighted mask based on a size of the grids,
    generate weighted values for the cells, by application of the weighted mask to the grids, based on the values assigned to the cells, and
    add the weighted values of one of the grids to calculate the total value corresponding to the one of the grids, and
  select, based on the total values, one or more of the grids as locations in which to place small cells.

8. A device comprising:
a memory to store instructions; and
a processor to execute one or more of the instructions to:
  determine network statistics for a geographical area associated with a carrier network,
  create a grid map, for the geographical area, by dividing the geographical area into cells,
  assign values to cells of the grid map based on the network statistics,
  divide the grid map into grids, wherein each one of the grids comprises a plurality of the cells,
  calculate total values for the grids based on the values assigned to the cells, including:
    select a weighted mask based on a size of the grids,
    generate weighted values for the cells, by application of the weighted mask to the grids, based on the values assigned to the cells, and
    add the weighted values of one of the grids to calculate the total value corresponding to the one of the grids, and
  select, based on the total values, one or more of the grids as locations in which to place small cells,
  wherein, when determining the network statistics, the processor is further to execute the one or more of the instructions to:
    retrieve human population density information associated with the geographical area,
    wherein the population density information comprises a population density for one of the cells of one of the selected grids, and
    wherein the processor is further to execute the one or more of the instructions to:
      select the one of the cells of the one of the selected grids, as a site in which to place one of the small cells, based on the population density information.

9. A device comprising:
a memory to store instructions; and
a processor to execute one or more of the instructions to:
  determine network statistics for a geographical area associated with a carrier network, wherein, when determining the network statistics, the processor is to:
    determine geographical locations of mobile devices within the geographical area, and
    determine subscriber statistics associated with the mobile devices,
      wherein the subscriber statistics comprise average usage of the carrier network by the mobile devices,
  create a grid map, for the geographical area, by dividing the geographical area into cells,
  assign values to cells of the grid map based on the network statistics,
  divide the grid map into grids, where wherein each one of the grids comprises a plurality of the cells,
  calculate total values for the grids based on the values assigned to the cells, including:
    select a weighted mask based on a size of the grids,
    generate weighted values for the cells, by application of the weighted mask to the grids, based on the values assigned to the cells, and
    add the weighted values of one of the grids to calculate the total value corresponding to the one of the grids, and
  select, based on the total values, one or more of the grids as locations in which to place small cells.

10. The device of claim 9,
where, when determining the network statistics, the processor is further to:
  determine mobility information for the mobile devices based on the geographical locations of the mobile devices,
where the mobility information comprises average rates of movement of the mobile devices through the geographical area, and
where the processor is further to:
  select a type for the new small cell based on the mobility information.

11. One or more non-transitory computer-readable media storing instructions executable by one or more processors of a computing device to perform a method, the method comprising:
  creating a grid map for a geographical area associated with a carrier network,
    wherein the grid map includes a plurality of cells, and
    wherein each of the cells represents a portion of the geographical area;
  collecting network statistics for the cells of the grid map;
  assigning values to the cells based on the network statistics;
  identifying one of the cells as a location in which to place a small cell based on the values;
  dividing the grid map into grids, wherein one of the grids includes a plurality of the cells;
  calculating a total value for the one of the grids based on a plurality of the values assigned to the plurality of the cells, including:
    selecting a weighted mask based on a size of the grids,
    generating weighted values for the cells, by applying the weighted mask to the grids, based on the values assigned to the cells, and
    adding the weighted values of one of the grids to calculate the total value corresponding to the one of the grids; and
  calculating other total values for other ones of the grids, wherein identifying one of the cells comprises:
    identifying the one of the grids as the location in which to place the small cell based on the total value, wherein the total value is greater than a particular threshold, or one or more of the other total values.

12. The media of claim 11,
where creating the grid map comprises:
    determining a coverage area of the small cell, and
    determining an amount of area represented by each one of the cells based on the coverage area, and
where each one of the cells represents the amount of area.

13. The media of claim 11, where collecting the network statistics for the cells comprises:
    identifying mobile devices within a portion of the geographical area associated with the one of the cells, and
    determining usages, of the carrier network, by the mobile devices while located within the portion of the geographical area.

14. The media of claim 13, where assigning the values to the cells comprises:
    determining an average usage for the one of the cells based on the usages by the mobile devices,
    determining one of the values based on the average usage, and
    assigning the one of the value to the one of the cells.

15. One or more non-transitory computer-readable media storing instructions executable by one or more processors of a computing device to perform a method, the method comprising:
    creating a grid map for a geographical area associated with a carrier network,
        wherein the grid map includes a plurality of cells, and
        wherein each of the cells represents a portion of the geographical area;
    collecting network statistics for the cells of the grid map;
    assigning values to the cells based on the network statistics; and
    identifying one of the cells as a location in which to place a small cell based on the values;
    dividing the grid map into grids based on a coverage associated with the small cell, wherein one of the grids includes the one of the cells; and
    calculating a total value for the one of the grids based on the value, including:
        selecting a weighted mask based on the coverage associated with the small cell, and
        applying the weighted mask to the one of the grids,
    wherein the total value is equal to a sum of weighted values assigned to a plurality of the cells included in the one of the grids, and
    wherein the weighted values comprise the value, assigned to the one of the cells, weighted by a corresponding portion of the weighted mask, and
    wherein identifying the cell as the location for the small cell comprises:
        identifying the one of the cells as the location for the small cell based on the total value.

* * * * *